May 31, 1932.  C. P. EISENHAUER  1,860,926
WATER SOFTENING APPARATUS
Filed July 6, 1925   10 Sheets-Sheet 1

INVENTOR
CHARLES P. EISENHAUER.
ATTORNEYS

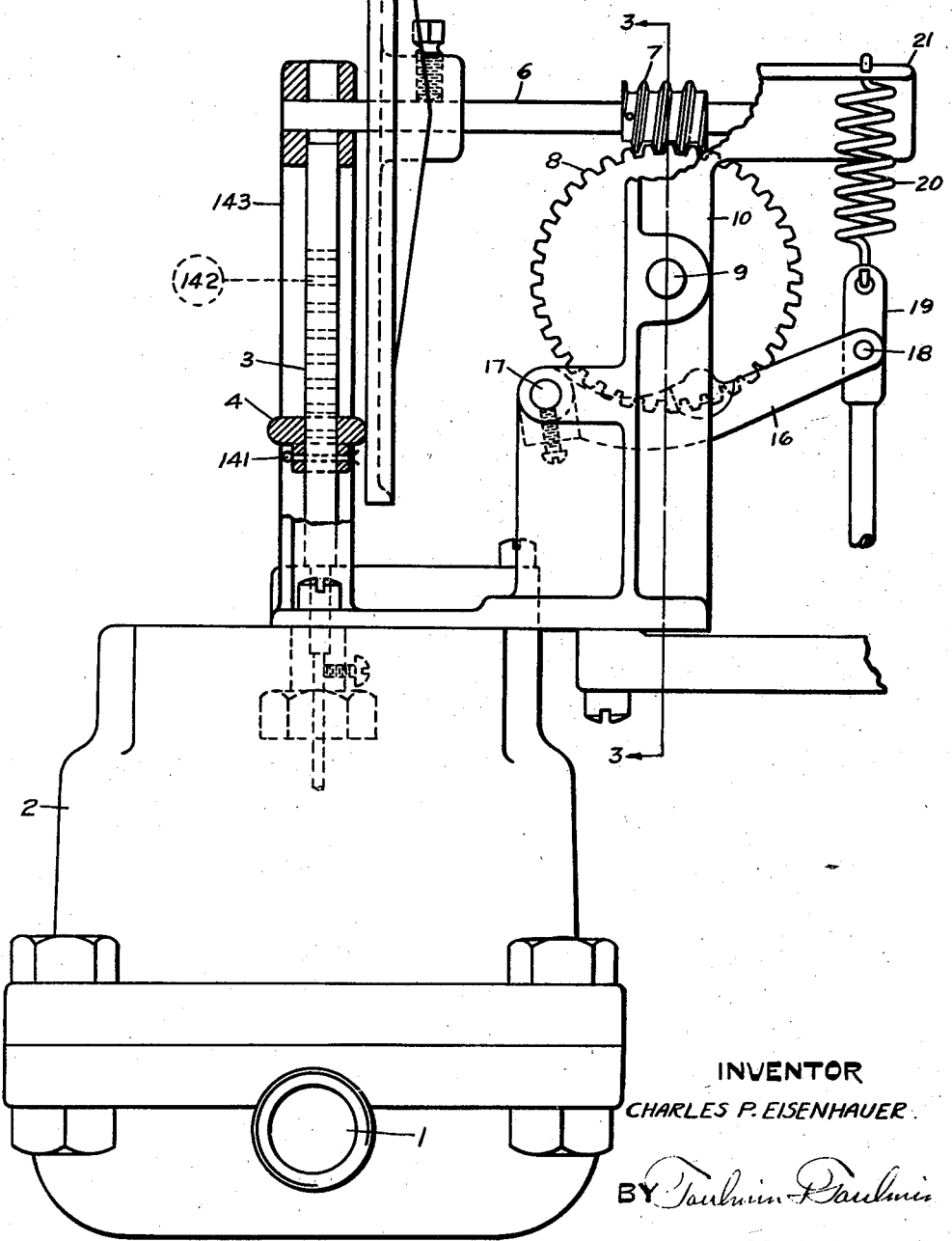

May 31, 1932.  C. P. EISENHAUER  1,860,926
WATER SOFTENING APPARATUS
Filed July 6, 1925   10 Sheets-Sheet 3
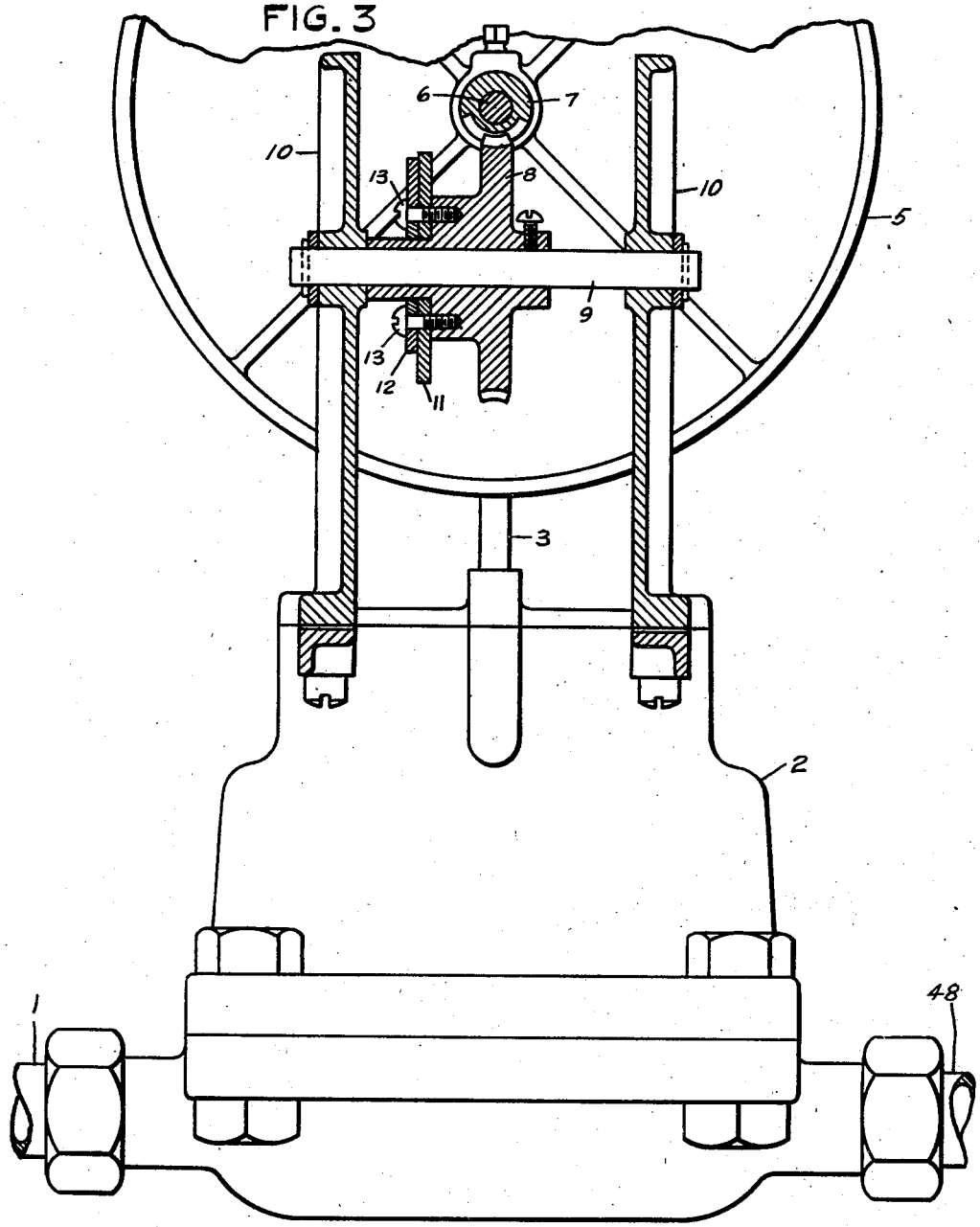
INVENTOR
CHARLES P. EISENHAUER
BY
ATTORNEYS May 31, 1932. C. P. EISENHAUER 1,860,926
WATER SOFTENING APPARATUS
Filed July 6, 1925 10 Sheets-Sheet 4
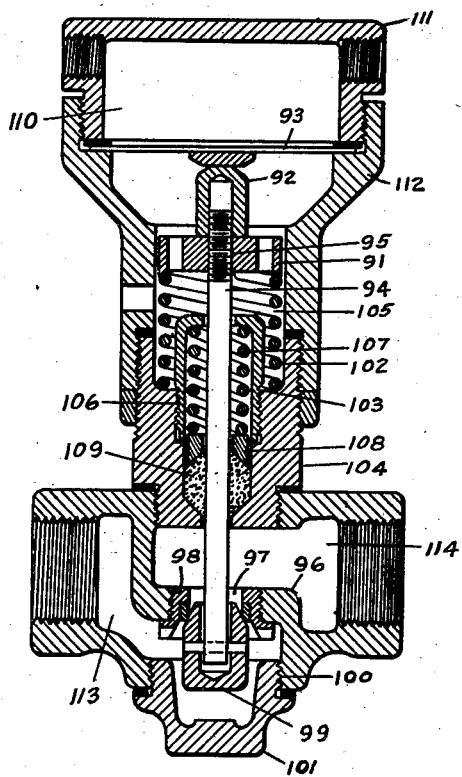
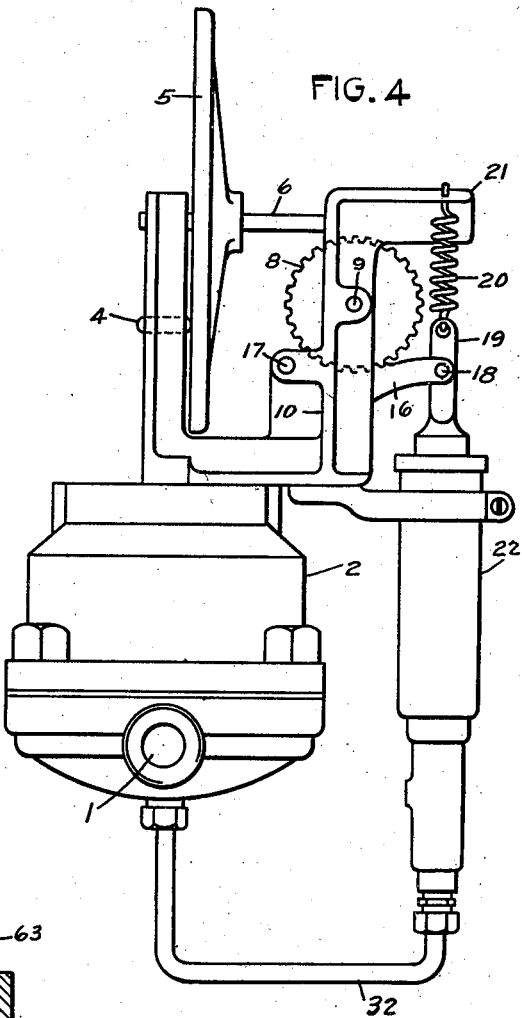
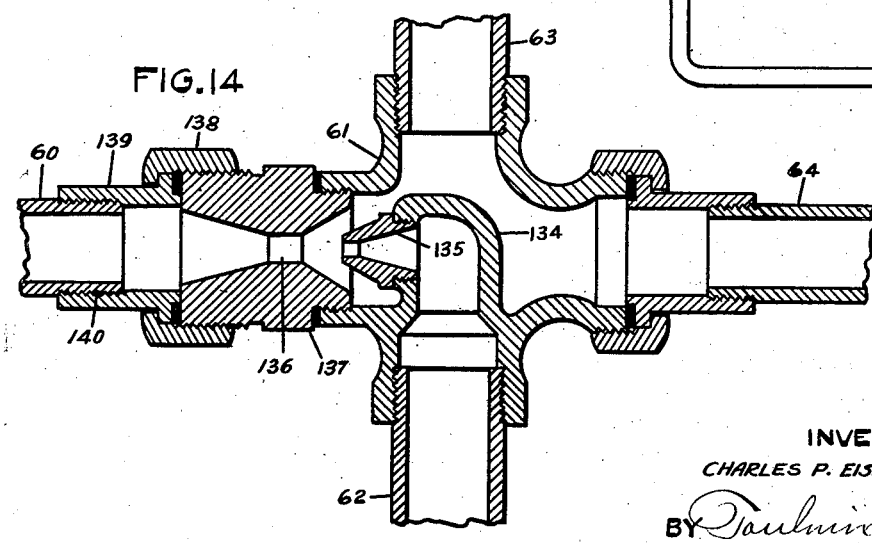
INVENTOR
CHARLES P. EISENHAUER
BY
ATTORNEYS May 31, 1932.  C. P. EISENHAUER  1,860,926
WATER SOFTENING APPARATUS
Filed July 6, 1925    10 Sheets-Sheet 5

INVENTOR
CHARLES P. EISENHAUER.
BY Toulmin & Toulmin,
ATTORNEYS

May 31, 1932. C. P. EISENHAUER 1,860,926
WATER SOFTENING APPARATUS
Filed July 6, 1925 10 Sheets-Sheet 6
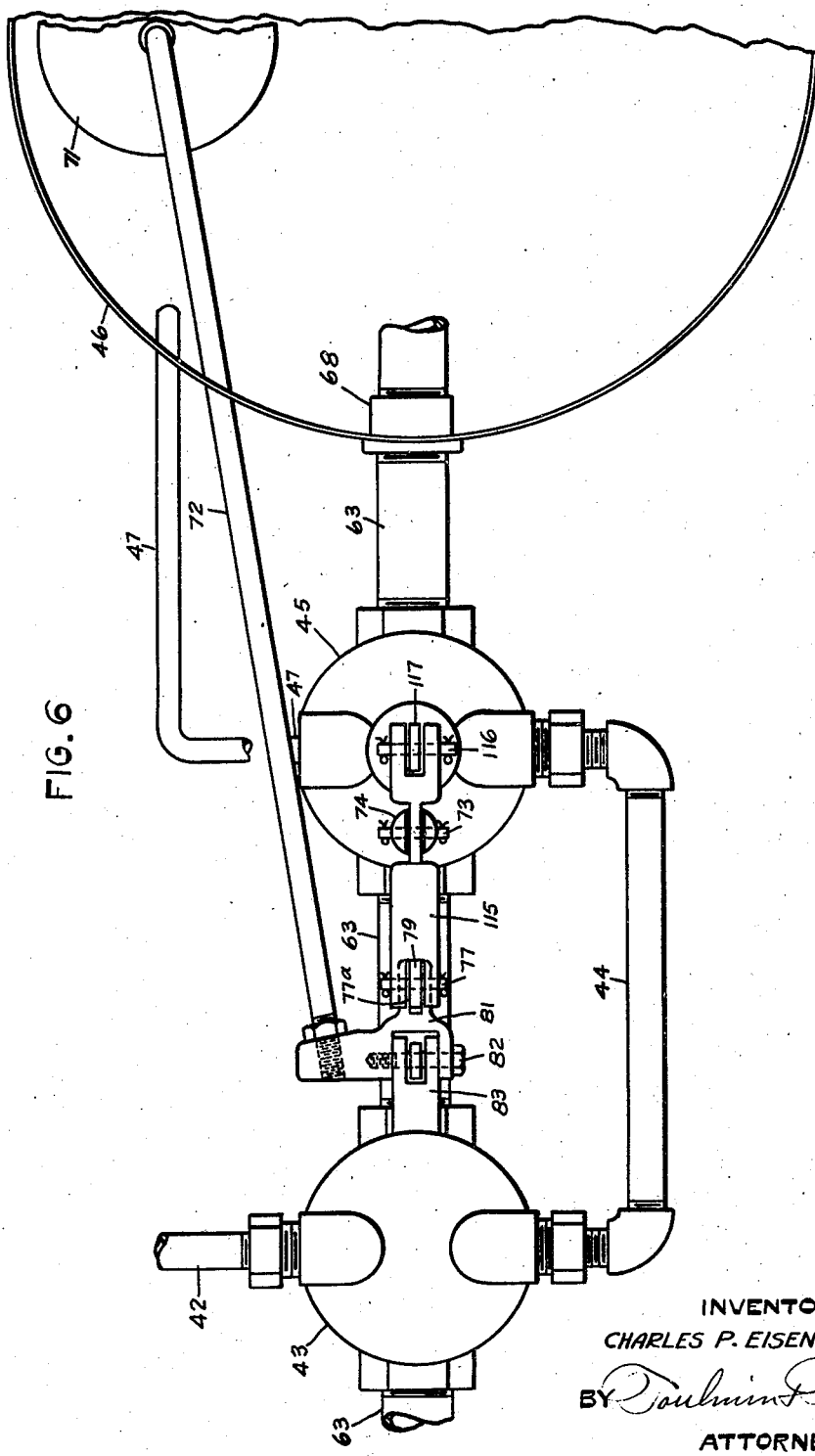
INVENTOR
CHARLES P. EISENHAUER
BY
ATTORNEYS May 31, 1932.  C. P. EISENHAUER  1,860,926
WATER SOFTENING APPARATUS
Filed July 6, 1925   10 Sheets-Sheet 7
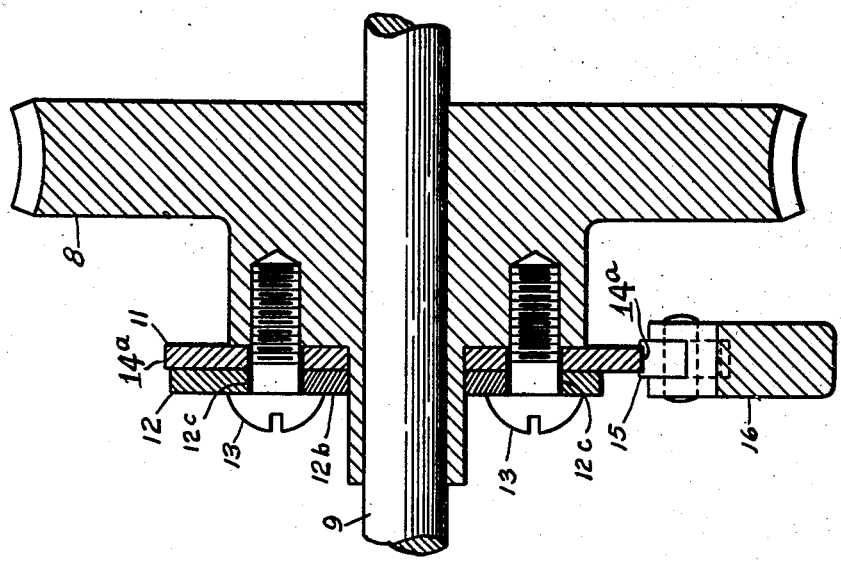
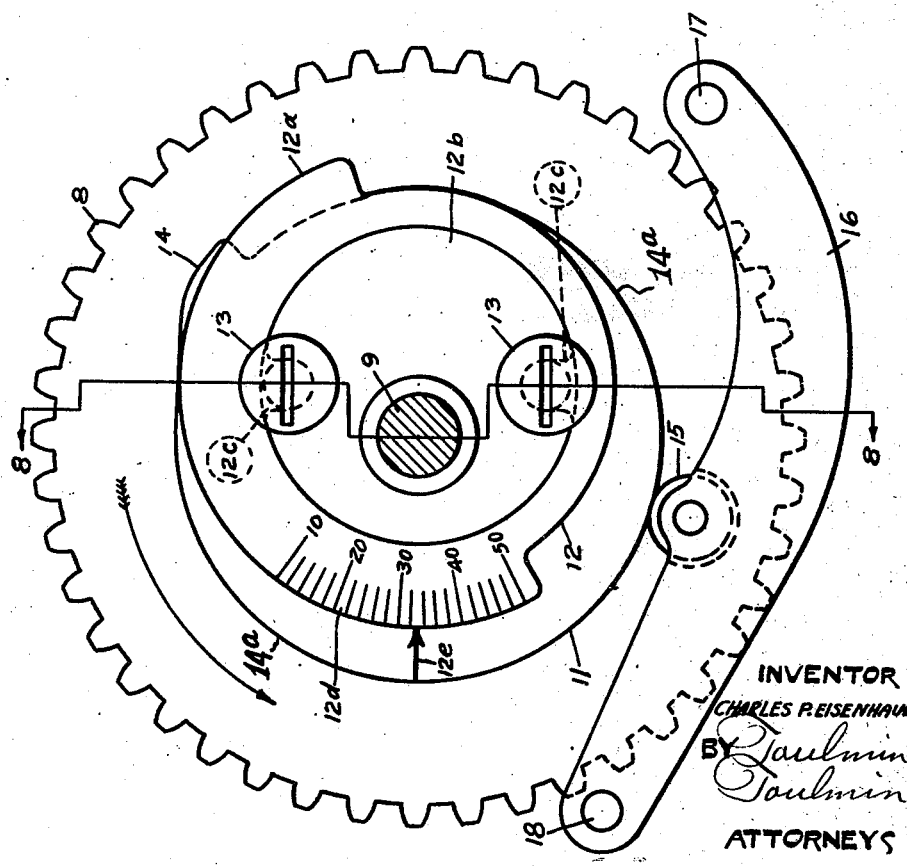
INVENTOR
CHARLES P. EISENHAUER
BY Toulmin + Toulmin,
ATTORNEYS May 31, 1932.  C. P. EISENHAUER  1,860,926
WATER SOFTENING APPARATUS
Filed July 6, 1925   10 Sheets-Sheet 8
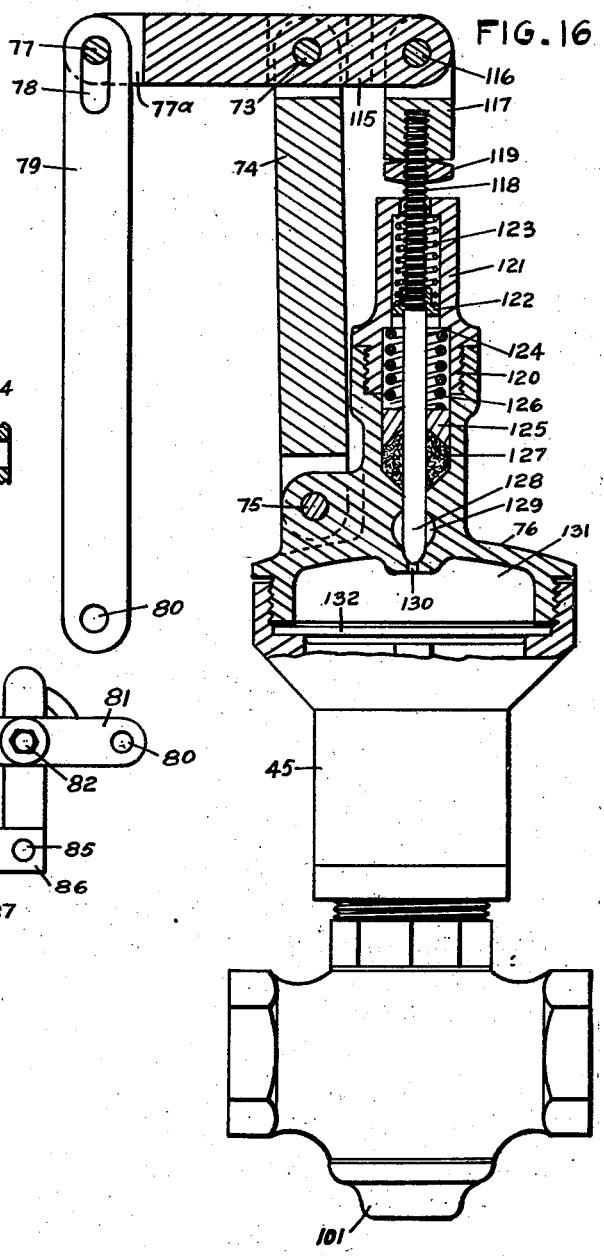
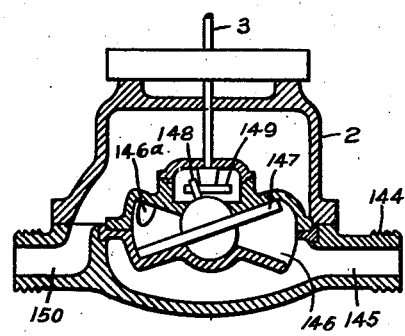
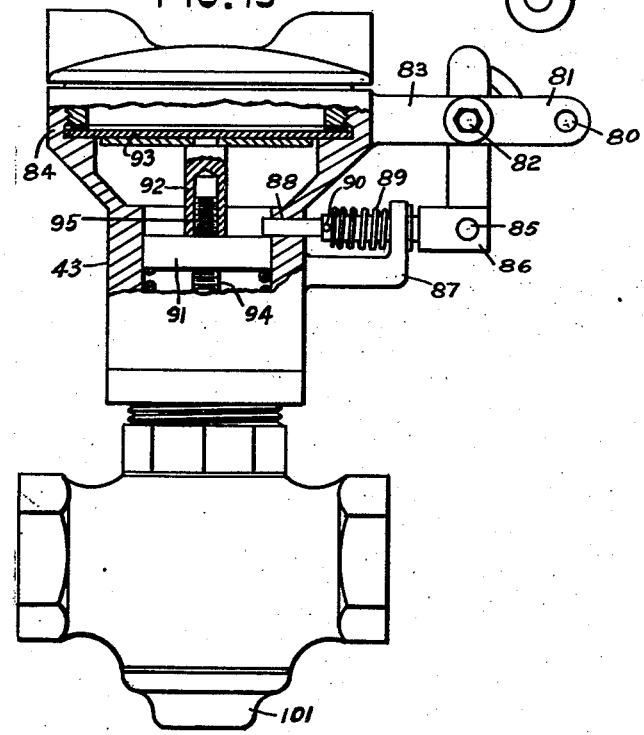
INVENTOR
CHARLES P. EISENHAUER,
ATTORNEYS

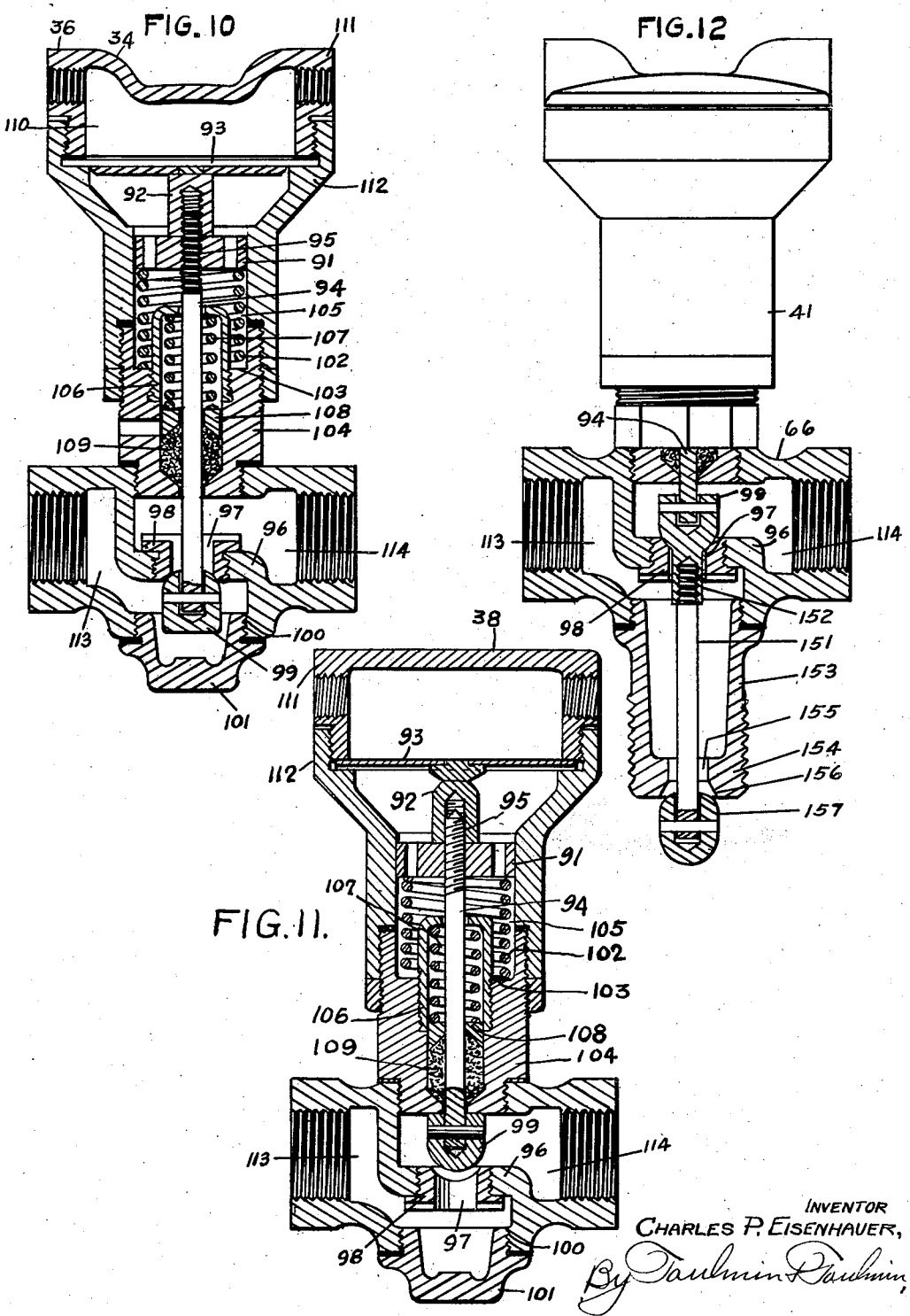

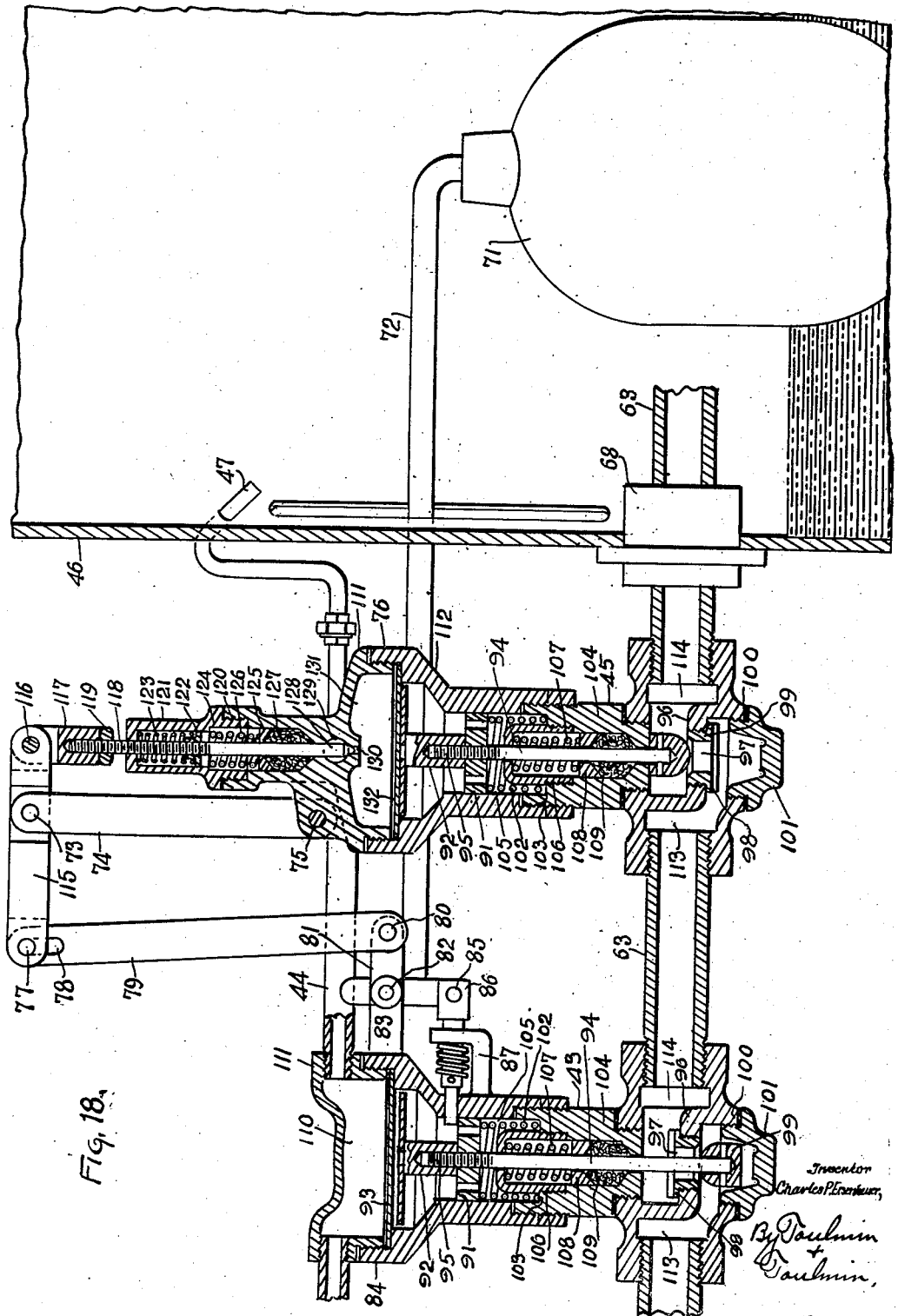

Patented May 31, 1932

1,860,926

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

WATER SOFTENING APPARATUS

Application filed July 6, 1925. Serial No. 41,580.

It is the object of my invention to provide a water softening apparatus and in particular an automatic water softening apparatus.

It is my object to provide an apparatus which is fully automatic for softening hard water and for regenerating the softening material. I prefer to utilize the water passing through the system as a source of energy for operating the control of the alternating period of softening and regeneration and as a means of timing these operations.

It is my object to provide a fully automatic water softening apparatus in which some such means as a meter or other device operated by the amount of incoming water may be utilized to furnish sufficient power only for operating the controlling mechanism for the system which determines its alternating periods of operation, the power being required for this specific purpose being of such a minor amount as to not interfere with the operation of the meter. I provide the power for operating the system directly from the incoming hydraulic pressure.

It is a further object to provide means of adjusting the apparatus to varying hardnesses of water and various times needed for softening or regenerating or various quantities of water without changing the construction of the apparatus, thereby making it possible to manufacture on uniform production the apparatus desired without having special parts for special hardnesses of water and special times of softening and regeneration.

It is an additional object to provide in the water softening receptacle means of distributing the water through the mineral and means of preventing the mineral from making its exit from the water softening receptacle. Specifically, it is my object to provide a screen both at the top and bottom of the tank containing the mineral. The volume of mineral between the screens is preferably slightly less than the space between the screens. This accomplishes the object of permitting the mineral to press upwardly against the upper screen when the water flows upwardly during softening, thus compelling the water to come in contact with the mineral softening the water. Likewise I regenerate downwardly. When a relatively small body of mineral is used the water can float the mineral, which allows channeling and efficient softening as the water gets at all parts of the mineral. This prevents packing of the mineral and loss of efficiency.

It is a further object to provide means of setting the apparatus for the proper grain gallon hardness at the will of the operator.

It is a further object to provide means of varying the time element by providing setting means for the cams, thus utilizing only a single cam mechanism of the requisite number of parts.

It will be understood that it is my object to provide an apparatus which will automatically pass hard water into the softening tank, soften the water therein, deliver it to the household system of pipes, cut off the softening process when the mineral is substantially exhausted, deliver brine into the tank of softening material from a reservoir of brine to regenerate the mineral, to regenerate downwardly, wash the salt from the softening tank, shut off the wash water and brine supply and turn on the water to be softened and pass it again through the softening material into the tank in the opposite direction from regeneration, and refill the salt tank with water.

It is a further object to provide upward softening and downward regeneration in this system.

It is an object of my invention to provide means of replenishing the brine tank with fresh water at the bottom so that the fresh water will proceed upwardly from the bottom to the top to insure thorough mixing of the salt with the water and the taking out of the salt water at the bottom which again insures taking the water out of the top which will have the least salt in it through the portion of the liquid at the bottom which will have the greatest amount of salt. This insures a thorough incorporation of the salt in the water at all times.

It is a further object to eliminate the time element at the meter, to use the same line for refilling the brine tank as is used for withdrawing the brine, to refill the brine tank from the bottom with fresh water and to withdraw the brine from the bottom of the brine tank in order to insure thorough solution of the salt in the water as the heavier and more saturated solution will be at the bottom of the brine tank.

It is a further object of my invention to use a gravel bed at the bottom of the brine tank between the exit from the brine tank and the body of the solution to insure a proper diffusion of the salt in the water.

Referring to the drawings:

Figure 2 is a side elevation partially in section with a supporting bracket broken away showing the meter and the driving connections driven thereby:

Figure 3 is a rear elevation partially in section on the line 3—3 of Figure 2 of the same apparatus shown in Figure 2;

Figure 4 is a complete side elevation of the apparatus in Figure 2;

Figure 6 is a plan view of the salt tank, the float apparatus, the salt valve and the refill valve;

Figure 7 is an elevation in detail of the cam roller, roller arm and cams with the actuating worm gear;

Figure 8 is a section on the line 8—8 of Figure 7;

Figure 9 is a section through a typical water meter construction showing the arrangement of the actuating parts and casing diagrammatically;

Figure 10 is a section through a typical hydraulic valve;

Figure 11 is a view partially in section of a softening line valve;

Figure 12 is a view partially in section of the by-pass valve;

Figure 13 is a section through a modified form of valve;

Figure 14 is a section through the injector mechanism;

Figure 15 is an elevation partially in section showing the locking mechanism of the refill valve;

Figure 16 is a view partially in section of the salt valve;

Figure 18 is a section through the brine control and refill mechanism.

Figure 1:
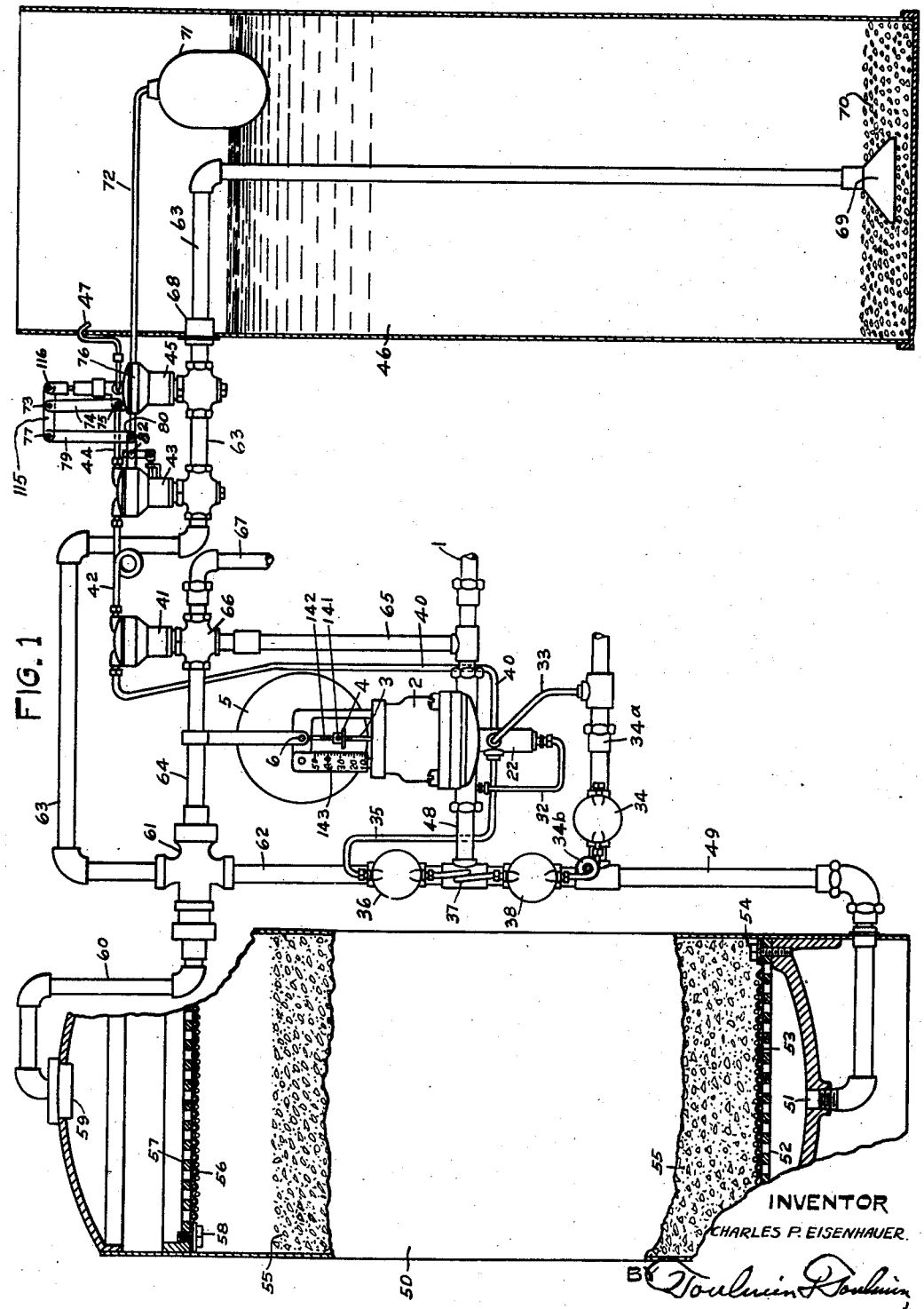
Figure 1 is a side elevation of the complete automatic softening apparatus with the softening tank partially in section and with the salt tank in section.
Figure 5:
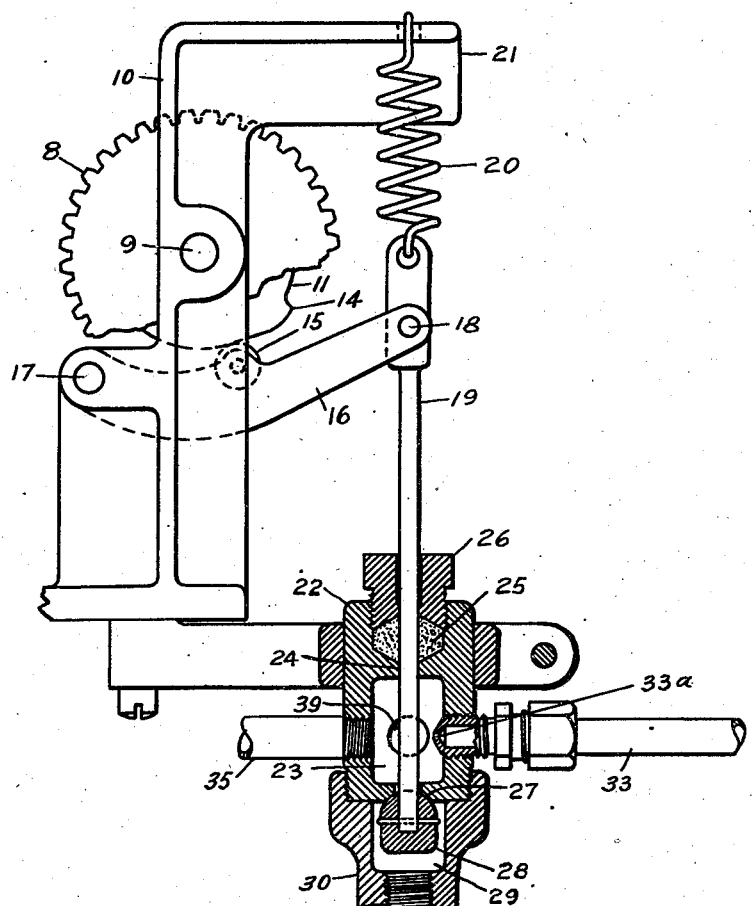
Figure 5 is a detail view of the control valve in section with the actuating gear broken away to show the cam roller and cam.

Referring to the drawings in detail, 1 designates the incoming hard water line which passes through an apparatus actuated by the hard water such as a water meter, generally designated 2. This water meter serves to actuate a shaft 3, and driving member 4 and in turn a friction disk 5. This friction disk 5 actuates the shaft 6. The shaft 6 operates a worm 7 which in turn operates a worm wheel 8 mounted on a shaft 9 journalled in the supporting brackets 10. This shaft carries a pair of cam members 11 and 12. These cams are adjustable relative to one another through the set screws 13. The cams are eccentrically mounted on the shaft 9 so that the length of the high point 14 of the cam 11 may be varied as will be hereinafter explained in some detail. A cam roller 15 carried on a cam follower arm 16 which is pivoted at 17, follows the cam and is actuated thereby. The other end of this cam following mechanism is connected at 18 to the upper end of a plunger 19 which is held upwardly yieldingly by a spring 20 connected at one end to the plunger 19 and at the other end to a bracket 21. This plunger 19 works in a control valve 22 which valve consists of a casing having an interior chamber 23. The upper end through which the plunger enters is provided with an aperture 24 for that purpose. The plunger is surrounded with a packing 25 and a packing nut 26. The bottom of the chamber is provided with an opening 27 against which the valve member 28 seats, which member 28 is carried by the valve plunger 19. This valve member reciprocates in a second chamber 29 formed in the casing 30 screwed to the bottom of the casing 22. The casing 30 is provided with a lower aperture 31 for reception of the inlet pressure pipe 32. The mouth of the pipe 33 is provided with a restricted orifice 33a which allows the accumulation of liquid in the chamber 23 to bleed to the drain.

The chamber 23 is provided with an outlet pipe 33 communicating with the drain line 34a. The drain line valve is designated 34. Another exit line is provided from the chamber 23 designated 35 which leads to the valve 36 controlling the passage of hard water to the top of the softener which in turn communicates by the pipe 37 with the hard water inlet valve 38 controlling the passage of hard water to the bottom of the softener. This valve is connected by the pipe 34b to the valve 34. The exit port 39 communicates with the pipe 40 which leads to the by-pass valve, refill valve and brine valve. The by-pass valve is designated 41, the pipe connecting the by-pass valve to the refill valve is designated 42, the refill valve is designated 43, the pipe connecting it to the brine valve is designated 44. The brine valve is designated 45 and the waste pipe from the train of valves to the brine tank 46 is designated 47.

The line from the meter is designated 48. It meets a vertical pipe at right angles designated 49 which leads to the bottom of the softener tank 50 which communicates with, at the point marked 51 beneath the grating 52, the screen 53 which is carried by the grating. This screen and grating are retained in position by the bolts 54. The liquid passes upwardly through the softening material 55, through the screen 56 mounted on the grating 57. The bolts 58 retain these pieces in position. The liquid passes out at a point above the screen on top of the tank at 59, through the pipe 60 to the fitting 61 which contains an injector. This fitting is connected on one side to the pipe 60 and on another side to the pipe 62 from the pipe 48. On a third side it is connected to the brine line 63 and on the fourth side it is connected to the outgoing service line 64. This service line is connected to the incoming hard water line by-pass pipe 65 which leads into the fitting 66 in which is a portion of the valve member of the by-pass valve 41. The pipe 67 leads to service, for either hard or soft water depending upon the state of the system. The brine line contains the valve 43 which is a refill valve and the valve 45 which is the brine valve. It enters the brine tank 46 at 68 and goes downwardly to the bottom of the brine tank where it terminates in a bell 69 which is a slight distance above the bottom of the tank and which is buried beneath the layer of gravel designated 70.

The float 71 in the brine tank which is supported on the float arm 72 is pivoted at 82 on the refill valve 43. This float arm 72 is connected to a bell crank 81 pivoted at 82 on a bracket 83 on the housing 84 of the refill valve 43. The lower end of this bell crank has pivotally connected to it at 85 a plunger 86 which is guided at one end in a bracket 87 carried by the housing of the valve 43 and at the other end is guided in an aperture 88 in the side wall of the housing. A helical spring 89 surrounds the plunger 86. It is located between the bracket 87 and the cotter pin 90 carried by the plunger 86. The head of this plunger 86 is adapted to be thrust above the piston 91 which is carried on the piston rod 92. This piston rod 92 is connected to the diaphragm 93.

There is provided at 80 on the end of the bell crank 81 a vertical link 79 which has an elongated slot 78 at its upper end. Working in this slot is a transverse pin 77 carried in the jaws 77a of the lever 115. The lever 115 is pivoted at 73 upon the vertical member 74 which acts as its support. The bottom of the pivotal support is pivoted at 75 upon the casing 76 which is a cover of the brine valve 45.

The construction of the lower part of the refill valve can be seen in Figure 10. A valve stem 94 is threaded at 95 in the piston and piston rod 91 and 92 respectively. This valve stem extends downwardly into the brine line where it seats against a partition 96 arranged in that line, such partition having an orifice 97 within a valve seat 98 against which the valve member 99 seats. This valve member is carried on the lower end of the valve stem 94. Beneath the valve seat is provided an aperture 100 in the pipe which is closed by a screw plug 101 for draining and cleaning purposes. Below the piston 91 is located a helical spring 102 one end of which abuts the piston, the other end of which abuts a top 103 of a screw plug 104 which fits into the base of the casing 43 of the valve. This spring is located within a chamber 105. Threaded into the interior of the screw plug 104 is an upwardly projecting dome like member 106 which acts as the upper retaining member for an interiorly located spring 107 which is mounted upon the washer 108 above the packing 109 around the valve stem 94.

The springs 102 and 107 resist the downward movement of the valve stem and valve member against the hydrostatic pressure which is applied to the diaphragm in the chamber 110. A screw cap 111 is provided for holding the diaphragm in position against the shoulders 112 of the casing 43. Thus pressure applied against the diaphragm in the chamber 110 will depress the diaphragm 93 compress the springs 102 and 107 and around the valve 99 permitting the fluid to flow in either direction through the chambers 113 and 114 in the fitting which forms a part of the brine line 63, when this form of valve is used in the brine line. It will be understood that the mechanism of a number of these valves is similar, although they are used for different purposes in the system. In this case the standard valve shown in Figure 10 has added to it the locking device of Figure 15.

Returning to Figures 16 and 17, it will be observed that a lever 115 has pivotally supported on the outer end thereof at 116 a link 117 in which is threaded a valve stem 118. This valve stem is adjustable in the link 117 and is fixed in its adjustment by the lock nut 119. This valve stem is contained within the upper portion of the brine valve casing or cap 76. This casing has threaded at 120 in the upper portion thereof an inverted cup shaped member. This cup shaped member is designated 121. Between the inner end of the cup shaped member and a collar 122 on the valve stem 118 is a helical spring 123.

Between a shoulder 124 on this cup shaped member and the top of a packing washer 125 is a second helical spring 126 which serves to keep the packing washer 125 and the packing 127 in position. The lower end of the valve stem terminates in a needle valve member 130

128 which projects through the pipe 129 to close the orifice 130 leading from the pipe 129 into the diaphragm chamber 131 above the diaphragm 132 which controls the brine valve.

Figure 17:
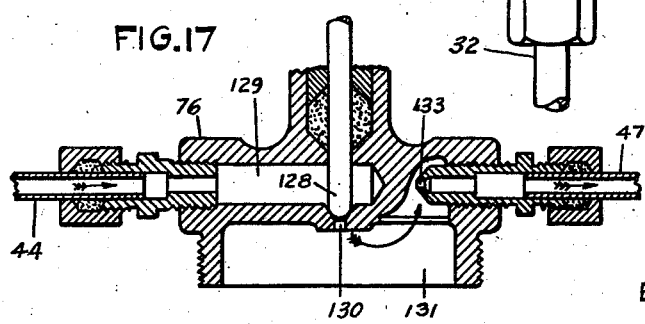
Figure 17 is a section through the top of the salt valve showing the arrangement of the incoming and outgoing passageways for hydrostatic pressure to actuate the diaphragm in the valve and to exit the pressure from behind the diaphragm.

Referring to Figure 17, which is a section taken at right angles to the view in Figure 16, it will be seen that the hydrostatic fluid will enter through the pipe 44 into the casing 76 by way of pipe 129, pass the needle valve member 128 through the orifice 130 in the chamber 131. The surplus hydrostatic fluid will bleed through the minute opening 133 through the pipe 47 into the tank. The function of this will be explained hereafter.

Turning to the diaphragm 132, the construction is the same as that found in Figure 10 save that the valve member 99 is arranged as in Figure 11 above the partition 96 rather than below it. The movement of the diaphragm serves to open and close this valve.

In order to draw brine from the brine tank when desired when the hard water is flowing through the pipe 62 into the casing 61, I provide a right angled interiorly projecting casing 134 with a nozzle 135 carried in said casing 134 within the casing 61 having its major axis at right angles to the pipe 62. Spaced from, but adjacent to this nozzle 135 is a restricted orifice 136 in a collar 137 which is carried at one end by the casing and is pulled at its other end to the pipe 60 which in this instance feeds the water and brine into the tank for downward regeneration. A collar 138 connects 137 to a sleeve 139 which in turn is threaded at 140 on the pipe 60. The exact details of fitting the parts together are immaterial.

In order to adjust the mechanism for the grain hardness of the water being softened, I provide a cotter pin 141 (Fig. 2) in the driving member 4 so that the driving member 4 may be positioned in the shaft 3 at any elevation by inserting the cotter pins in the holes 142 in the shaft. This positioning is assisted by the grain hardness scale 143 carried adjacent thereto.

As to the construction of the device for operating the cams, any form of device will be suitable which provides sufficient power for merely rotating the cams, as it is my primary purpose not to provide any means of operating the operating valves directly by power furnished by the meter, but only to get sufficient power for operating the controlling cams.

Referring to Figure 9, the incoming water pipe is connected at 144. The water passes through the pipe 145 in the meter casing into the disk chamber 146 when it actuates the disk 147 which carries the shaft 148 on the crank 149, which crank is mounted upon the shaft 3 carrying the driving member 4. The water passes out through an opening 146a through the pipe 150 to the pipe 48.

Turning to the by-pass valve shown in Figure 12, it will be understood that the upper part of the valve is the same as that shown in Figure 10, the valve stem 94 being operated by the diaphragm 93. The valve member is slightly different in that it carries a second valve stem 151 threaded into an extension of it at 152. The valve member 99 seats on the under side of the partition 96 as in the case of the brine valve and other valves. Below the opening 97 through which the fluid passes is located an elongated threaded collar 153.

This threaded collar carries the by-pass pipe 65 and is also provided with a restricted mouth at its lower end 154 having an opening 155 and a valve seat 156 for receiving the by-pass valve member 157. The valves designated 34 and 36 are of the type shown in Figure 10. The valve designated 38 is that shown in Figure 11 which is just as Figure 10 with the exception that the valve 99 is on the top of the valve stem instead of below it.

METHOD OF OPERATION

*Softening.*—Assuming that the driving member 4 has been set on the shaft 3 opposite the proper point on the scale 143 for the proper grain gallon hardness of the water, the operation of this system is as follows. The hard water enters the pipe 1, actuates the meter mechanism in the meter 2, rotates the shaft 3, the driving member 4 and the disk 5. This disk in turn operates the shaft 6, worm 7, worm wheel 8, shaft 9, and the cams 11 and 12. (Figures 3, 5, 7 and 8.) The cam roller 15 follows along on the lower level 14a of the cam 11 during the period of softening. During this period the hard water is passing through the pipe 48, valve 38, pipe 49 and to the bottom of the tank 50 upwardly through the softening material 55 at the top of the tank at 59 through the pipe 60 and pipe 64 to service.

As the softening material 55 is normally about two inches less in depth than the total distance between the screens, it is possible for the material to be floated by the incoming water in either direction thereby forming channels through the material, floating the material to an extent and thoroughly mixing the water with the softening material, to insure the maximum contact of the hard water with the softening material to secure the maximum result from the softening material.

During regeneration, the drain valve 34 is closed, the valve 38 is open and the valve 36 is closed. The pressure on the diaphragms of these valves has been released and the springs in them operate the valves. During regeneration the by-pass valve 41 is closed, the refill valve 43 is closed and the brine valve 45 is open.

*Regeneration.*—When the cam roller 15 rides up on the high point 14 of the cam 11 the plunger 19 is depressed admitting hydraulic pressure through the pipe 32 from the hard water line 1 and the chamber 29 into the chamber 23 of the control valve 22. This admits pressure to the pipes 40 and 35.

The pressure in the pipe 35 serves to open the valve 36. The pressure passes through the pipe 37 to the valve 38, serving to close that valve while the pressure passing through the pipe 34b serves to open the drain valve 34 to allow liquids to pass through the pipe 34a. The restricted opening 33a in the pipe 33 prevents the pressure from exiting through the pipe 33 during this time as the exhausting through that opening is at a relatively slow rate.

The hard water therefore passes through the pipe 48 upwardly through the pipe 62 through the pipe 60, out the opening 59, through the screen 56, through the softening material 55, downwardly through the screen 53, out 51 into the pipe 49, past the valve 34 to the drain through the pipe 34a.

*Hard water by-pass.*—In order to prevent the service line 67 from becoming dry, the hard water is allowed to pass up the pipe 65 into the fitting 66 through the open by-pass valve 41 into the pipe 67 so that during the period of regeneration the service line 67 will have hard water. This is brought about by the pressure being admitted to the pipe 40 from the control valve, which pressure is derived from the main line 1 and applied behind the by-pass valve to open it.

*Brine application to softening material.*—The brine is drawn from the brine tank through the diffusing gravel 70 into the bell 69 up the pipe in the brine tank, through the brine pipe 63, into the fitting 61 through the orifice 136 and into the pipe 60 and downwardly over the softening material, out through the pipe 49 to the drain 34a.

In order to permit this, the pressure in the pipe line 40 has not only opened the by-pass valve 41, but has also passed through the pipe 42 to the refill valve 43 opening it by the application of the pressure behind the diaphragm 93. The depression of the diaphragm 93 lowers the piston 91 permitting the plunger 88 to snap into position above it, locking the refill valve open. During the softening operation the brine valve is open. Thus both the brine valve and refill valve being open the salt water can pass into the softening material tank as described. The pressure from the pipe 40 also passes through the pipe 44 but is stopped in the passageway 129. (Fig. 16) by the needle valve 128 which at this time has closed the opening 130 into the chamber 131 over the diaphragm 132 of the brine valve 135.

The brine continues to flow until the float 71 descends to a predetermined distance. When it descends it carries with it the float arm 72 and the link 79. The link 79 does not effect the lever 115 until the float gets to its lowermost point when the upper end of the slot 78 engages with the pin 77. When this occurs the lever 115 is pulled down on one side and lifted on the side where it is connected to the link 117. This lifts the needle valve 128 allowing the pressure in 129 to enter the chamber 131 to depress the diaphragm 132 and close the brine valve, stopping any further delivery of brine.

*Washing.*—For a considerable period the parts stay in regenerating position and the hard water continues to flow up the pipe 62, through the pipe 60 into the top of a softening tank at the bottom and thence to drain, washing away the salt water out of the tank so that this salt water cannot get into the service system. When this is accomplished the system is so timed that the roller will fall off the high point of the cam and the parts will be restored to softening position.

When this occurs the valve 34, closes, the valve 38 opens and the valve 36 closes. The by-pass valve closes and the pressure in the lines 40 and 35 is released by bleeding through the line 32 to drain 34a. At this moment the refill valve is still locked open and the brine valve is open due to the release of pressure thereon. The lock pin 88 is still holding the refill valve open. A part of the softened water passes into the pipe 63 and thence into the salt water tank to replenish the liquid therein. As the liquid increases it gradually lifts the float 71 until the float arm is lifted sufficiently to pull the pin 88 against the spring 89 permitting the piston 91 to rise to the refill valve to close it, shutting off further delivery of the water to the salt tank. Any surplus of liquid in the lines 42, 43 and 44 and behind the valves 43 and 45 bleeds into the salt water tank from the pipe 47.

*Grain hardness cam adjustment.*—The cam 12 is in fact a ring having a high portion 12a. This ring is mounted upon an eccentrically located plate 12b mounted on the shaft 9. This plate 12b is provided with the slots 12c in which are located the set screws or bolts 13. The ring is about 1/10000" thicker than the eccentrically mounted disk 12b so that the heads of the screws 13 will clamp the ring 12 in position. It is understood that the cam 11 and the plate 12b are pressed on the gear 8 and turn with it in the shaft 9. By loosening the screws 13, the ring 12 with its high part 12a can be either completely concealed behind the cam 11 or have its high point 12a projected beyond the high point 14 of the cam 11 to increase the length of the high point and therefore increase the time during which the plunger 19 will be depressed and thereby increase the time of regeneration. A scale 12d and a pointer 12e are provided to regulate this period.

It will be understood that I desire to comprehend within my invention such modifications as may be necessary to adapt it to varying conditions and uses.

Having thus fully described my invention, what I claim as new and desire to secure by Letters Patent, is:—

1. In an automatic water softener, a tank containing softening material, a hard water inlet line for supplying water to be softened thereto, means actuated by the water passing through the inlet water line for determining the period of softening and regenerating, an exit line from the softening tank, a container for a regenerating chemical, a line leading from the regenerating chemical container to the softening material container, a control valve operated by the means actuated by the inlet water from the hard water inlet line, said control valve being adapted to control a plurality of valves regulating the alternate softening and regenerating operations.

2. In an automatic water softener, a tank containing softening material, a hard water inlet line for supplying water to be softened thereto, means actuated by the water passing through the inlet water line for determining the period of softening and regenerating, an exit line from the softening tank, a container for a regenerating chemical, a line leading from the regenerating chemical container to the softening material container, a control valve operated by the means actuated by the inlet water from the hard water inlet line, said control valve being adapted to control a plurality of valves regulating the alternate softening and regeneration, and a by-pass line from the inlet water line to the outlet line adapted to be brought into operation during the period of regeneration, and a valve controlling said by-pass line controlled by the control valve.

3. In an automatic water softener, a combination of a softening means and regenerating means for the softening means, means actuated by the passage of incoming hard water adapted to regulate the period of softening and regeneration, a control valve operated by said means, said control valve controlling the application of hydrostatic pressure to means for alternately passing hard water through the softener for softening and passing the regenerating chemical in the softener for regeneration.

4. In an automatic water softener, a combination of a softening means and regenerating means for the softening means, means actuated by the passage of incoming hard water adapted to regulate the period of softening and regeneration, a control valve operated by said means, said control valve controlling the application of hydrostatic pressure to operate valves controlling the system, means alternately passing hard water through for draining the regenerating material from the softener, and means for replenishing with water the supply of regenerating chemical, and valves for controlling said means.

5. In an automatic water softener, a combination of a softening means and regenerating means for the softening means, means actuated by the passage of incoming hard water adapted to regulate the period of softening and regeneration, a control valve operated by said means, said control valve controlling the application of hydrostatic pressure to operate valves controlling the system, means alternately passing hard water through the softener for softening and passing the regenerating chemical in the softener for regeneration, means during the latter period for draining the regenerating material from the softener and for by-passing the hard water around the softener, and means for replenishing with water the supply of regenerating chemical, and valves for controlling said means.

6. In an automatic softener, hard water inlet means, means adapted to be actuated by the passage of the hard water to control the period of softening and regeneration, means to soften the hard water, means to contain a regenerating chemical, means to supply said regenerating chemical to the softening means and return a portion of the water in the system to the container to the regenerating chemical container to replenish it, a control valve actuated by the means determining the period of regeneration and softening, and means associated with said control valve controlled thereby for adjusting the apparatus to soften during the one period, to regenerate during another period, and to replenish the chemical tank.

7. In an automatic softener, hard water inlet means, means adapted to be actuated by the passage of the hard water to control the period of softening and regeneration, means to soften the hard water, means to contain a regenerating chemical, means to supply said regenerating chemical to the softening means and return a portion of the water in the system to the container for the regenerating chemical to replenish it, a service line, a control valve actuated by the means determining the period of regeneration and softening, and means associated with said control valve controlled thereby for adjusting the apparatus to soften during the one period and adjusting the apparatus to regenerate during another period, and to by-pass the hard water around the softener during the period of regeneration direct to a service line.

8. In an automatic softener, hard water inlet means, means adapted to be actuated by the passage of the hard water to control the period of softening and regeneration, means to soften the hard water, a service line, means to contain a regenerating chemical, means to supply said regenerating chemical to the softening means and return a portion of the water in the system to the container for the regenerating chemical to replenish it, means to drain the chemical from the softening means, a control valve actuated by the means determining the period of regeneration and softening, means associated with said control valve controlled thereby for adjusting the apparatus to soften during the one period and adjusting the apparatus to regenerate during another period, and to by-pass the hard water around the softener during the period of regeneration direct to a service line, said means consisting of a plurality of valves such as a drain outlet valve, a softening line valve, a regenerating line valve, an injector, a refill valve, a brine valve, a float control for said refill valve and brine valve, a locking means controlled by said float means for the refill valve, and a cut off valve for said by-pass line.

9. In an automatic softener, hard water inlet means, means adapted to be actuated by the passage of the hard water to control the period of softening and regeneration, means to soften the hard water, means to contain a regenerating chemical, means to supply said regenerating chemical to the softening means and return a portion of the water in the system to the container for the regenerating chemical to replenish it, a control valve actuated by the means determining the period of regeneration and softening, means associated with said control valve controlled thereby for adjusting the apparatus to soften during one period and adjusting the apparatus to regenerate during another period, and to by-pass the hard water around the softener during the period of regeneration direct to a service line, said means consisting of a plurality of valves such as a drain outlet valve, a softening line valve, a regenerating line valve, an injector, a refill valve, a brine valve, a float control for said refill valve, a brine valve, a locking means controlled by said float means for the refill valve, a cut off valve for said by-pass line, and means to adjust the period of softening and regeneration to adjust the apparatus to the hardness of the water being softened, the consumption of the softened water and the pressure of the incoming hard water.

10. In an automatic softener, an inlet line communicating with the top and bottom of a softener tank, a softening tank containing softening material, means on either side of the softening material between the softened material and the inlet or exit points for maintaining mineral in the softener, a regenerating chemical line, a by-pass line from the inlet line to the service line, a service line connected to one of the branches of the line leading to the softening tank, means in the incoming line of hard water connected thereby for determining the period of softening and regeneration, means of controlling the mechanism for determining the softening and regeneration operations, a control valve, said control valve being regulated in its operation by the means actuated by the incoming hard water, means supplying water therethrough to the control valve, exit means from the control valve to diaphragm valves, a drain outlet diaphragm valve therein, a valve in each of the branches between the incoming line and the softener tank, a cut off valve for regulating the by-pass of water, an injector, a refill valve, a brine valve, a float control, a lock for said refill valve, said valves being hydrostatically controlled by the pressure admitted through the control valve against the diaphragms to open and close them.

11. In combination in an automatic softener, of an inlet line leading to the bottom of a softening tank, a softening tank, softening material therein, an exit line from the top thereof to a service line connecting the incoming line to the outgoing line, a drain line in the incoming line, a drain valve in the drain line, an incoming valve in the incoming line, a by-pass valve in the line connecting the incoming line to the outgoing line, a brine line connected to the outgoing line, a hard water by-pass line from the incoming line to the outgoing line, a valve controlling the hard water by-pass line, an injector in the outgoing line at the mouth of the brine line, a refill valve in the brine line, a brine valve in the brine line, a brine tank, a float in the brine tank, a lock to lock the refill valve controlled by the float, means controlled by the float to admit hydrostatic pressure from the refill valve to close the brine valve, a discharge passage for hydrostatic pressure into the brine tank, means for controlling the period of regeneration and the period of softening actuated by the incoming water, an incoming line, a control valve actuated thereby, means to deliver hydrostatic pressure from the incoming line to the control valve, means of delivering such hydrostatic pressure to said valves, whereby when softening is taking place the valves will be so arranged that the hard water will pass to the bottom of the softening tank and out the top to service, the hard water by-pass being closed by the hard water by-pass cut off valve, and when regeneration is taking place the valve in the line leading to the bottom of the softening tank is closed and the valve in the by-pass line from the hard water to the normal outgoing line is open and the drain valve is open so that the water will pass to the top of the softening tank and out the bottom to the drain, and brine will be brought from the brine tank through the injector to regenerate the material until the float descends to a predetermined point at which time the brine valve is closed, water passes through the softening material to wash it and then softening again starts, and a portion of the incoming water passes to the brine tank until the float unlocks the refill valve.

12. In combination as a part of a water softening system cooperating therewith, a water line, means mounted thereon adapted to be actuated by the passing water, a shaft driven thereby, a driving member carried by said shaft rotating therewith, a plate engaging with said driving member, the speed of said plate depending upon the adjustment of the friction member, a cam driven by said plate, a roller engaging with said cam, yielding means adapted to maintain said roller in engagement therewith, an arm carrying said roller, a control valve adapted to be controlled by the position of the roller on the cam, means to support said arm at one end, means to attach it to the plunger member of a control valve, and means passing from the water line to the control valve, and means to deliver said pressure from the control valve to the operating valves of the system, whereby hydrostatic pressure is controlled in its delivery from said control valve.

13. In combination as a part of a water softening system cooperating therewith, a water line, a meter, a driving member on the meter shaft, a disk driven thereby, a cam driven by said disk, and a control valve for controlling the application of hydrostatic pressure derived from the water line and delivered to a plurality of actuated means controlled by said hydrostatic pressure and a cam follower engaging with said cam adapted to control a control valve.

14. In combination as a part of a water softening system cooperating therewith, a water line, a meter, a driving member on the meter shaft, a disk driven thereby, a cam driven by said disk, a control valve for controlling the application of hydrostatic pressure derived from the water line and delivered to a plurality of actuated means controlled by said hydrostatic pressure, a cam follower engaging with said cam adapted to control a control valve and means to adjust the position of the driving member on the meter shaft.

15. In combination as a part of a water softening system cooperating therewith, a water line, a meter, a meter shaft, a driving member on the meter shaft, a disk driven thereby, a cam driven by said disk, a cam follower engaging with said cam adapted to control a control valve, a control valve for controlling the application of hydrostatic pressure derived from the water line and delivered to a plurality of actuated means controlled by said hydrostatic pressure, means to adjust the position of the driving member on the meter shaft, and a scale adjacent said adjusting means reading in grain hardness whereby the position of the driving member will determine the period of operation of the control valve.

16. In combination as a part of a water softening system cooperating therewith, an inlet water line, means actuated by said water consisting of a driving member, a driven member, a cam actuated by the driven member, said cam being adjustable to vary the extent of its high or low points, a cam follower, and a control valve operated by a cam follower riding on said cam, and yielding means to maintain said cam follower in engagement with said cam to cooperate to operate said control valve, and a pipe from the water line for delivering water to the control valve and a pipe to redeliver the water to valves to be actuated thereby.

17. In combination as a part of a water softening system cooperating therewith, an inlet water line, means adapted to be actuated by the incoming water, a shaft connected to said actuating means, a friction roller carried by said shaft, a relatively large disk driven by said roller, a worm and gear connected to said disks, a cam having high and low points driven thereby, a cam follower riding on said cam, a valve plunger connected to said cam follower, yielding means to maintain said cam follower in engagement with the cam, a control valve, and means for receiving and distributing hydrostatic pressure communicating with the control valve.

18. In combination, a water softening system, means for softening water, means for delivering hard water thereto, means for removing softened water therefrom, a tank for supplying a regenerating chemical, a supply line for supplying said chemical, a float in said regenerating chemical tank, a refill valve in the chemical line, a chemical valve in the chemical line, means to supply hydrostatic pressure to actuate said valves, means to lock the refill valve when it opens, means to unlock it when the float rises to a predetermined point, means to by-pass the surplus hydrostatic pressure behind the valves to the chemical tank.

19. In an automatic softener, means to control the softening and regenerating apparatus depending upon the passage of the incoming water, means to soften the water by upward passage through the softening tank, means to regenerate the softener through the downward passage of the water and brine to the softening tank, a brine supply, means for drawing the brine supply during regenerating period, means for replenishing the brine supply tank after the brine has been drawn off in a predetermined quantity, means for washing the softening tank free of brine, and means for by-passing the incoming water to the service line to prevent interruption of service during the period of regeneration.

20. In an automatic softener, means to control the softening and regenerating apparatus depending upon the passage of the incoming water, means to soften the water by upward passage through the softening tank, means to regenerate the softener through the downward passage of the water and brine to the softening tank, a brine supply, means for drawing the brine supply during the regenerating period, means for replenishing the brine supply tank after the brine has been drawn off in a predetermined quantity, means for by-passing the incoming water to the service line to prevent interruption of service during the period of regeneration, and means for withdrawing the brine from the bottom of the brine tank.

21. In an automatic softener, means to control the softening and regenerating apparatus depending upon the passage of the incoming water, means to soften the water by upward passage through the softening tank, means to regenerate the softener through the downward passage of the water and brine to the softening tank, a brine supply, means of drawing the brine supply during the regenerating period, means of replenishing the brine supply tank after the brine has been drawn off in a predetermined quantity, means of by-passing the incoming water to the service line to prevent interruption of service during the period of regeneration, means of withdrawing the brine from the bottom of the brine tank, and a diffusing means in the bottom of the brine tank, the top of which is above the level of the mouth of the said lines from the tank, said diffusing means consisting of gravel.

22. In a water softening system, a pipe connecting a brine tank with a water softening tank, a water softening tank, a brine tank, a refill valve and a brine valve, means to hydrostatically open each of said valves, means to lock the refill valve open, a float in the brine tank, a float arm, means for pivotally supporting said arm, means of connecting said arm to said lock to unlock it when the float rises to a predetermined height in order to shut off the refilling of the brine tank, a needle valve to control the admission of hydrostatic pressure to open the valve, and means to connect said needle valve to said float and float arm so that said needle valve may be opened and closed by the movement of the float, and a loose connection between said float arm and said lock to permit of the movement of a needle valve, float arm and float at a time different from the operation of unlocking the refill valve.

23. In an automatic water softening apparatus, means to soften water, a supply of brine for regenerating the softening material, in a brine tank, a single means connected with the water softening means for delivering brine thereto and for delivering water from the water softening means to the brine tank, and means actuated by the incoming hard water to determine the period of operation of softening and regeneration and the delivery of brine from the brine tank and the delivery of fresh water from the water softening means to the brine tank, a control means, the former means adapted to be operated by said control means.

24. In an automatic water softening apparatus, means to soften water, a brine tank having a supply of brine for regenerating the softening material, a single means connected with the water softening means for delivering brine thereto and for delivering water from the water softening means to the brine tank, and means actuated by the incoming hard water to determine the period of operation of softening and regeneration and the delivery of brine from the brine tank and the delivery of fresh water from the water softening means to the brine tank, said means communicating with the brine tank for supplying brine and redelivering fresh water being located at the bottom of said brine tank.

25. In combination as a part of a water softening system, an actuating shaft actuated by water passing through the system, a cam mounted thereon, a disk eccentrically mounted on said shaft, adjustable screws carried by said shaft and mounted in slots in said disk, the heads of said screws overlapping a cam ring, a cam ring adapted to rotate on said disk behind the first mentioned cam, said cam ring having a high point adapted to extend the length of the high point on the first mentioned cam, said cam ring being slightly thicker than the disk, whereby the cam ring may be rotated and either be concealed by the first mentioned cam when moved in one direction or extended the length of the high point of the first mentioned cam when moved in the other direction.

26. In an automatic softener, an inlet line communicating with the top and bottom of a softener tank, a softening tank containing softening material, means on either side of the softening material between the softened material and the inlet or exit points for maintaining mineral in the softener, a regenerating chemical line, a by-pass line from the inlet line to the service line, a service line connected to one of the branches of the line leading to the softening tank, means in the incoming line of hard water connected thereby for determining the period of softening and regenerating, means of controlling the mechanism for determining the softening and regeneration operations, a control valve said control valve being regulated in its operation by the means actuated by the incoming hard water, means supplying water therethrough to the control valve, exit means from the control valve to diaphragm valves, a drain outlet diaphragm valve therein, a valve in each of the branches between the incoming line and the softener tank, a cut off valve for regulating the by-pass of water, an injector, a refill valve, a brine valve, a float control, a lock for said refill valve, said valves being hydrostatically controlled by the pressure admitted through the control valve against the diaphragms to open and close them, and yielding means associated with each of said valves for moving the valves in the opposite direction to that in which they are moved by the hydrostatic pressure.

27. In a water softening apparatus, a softening means, a regenerating means, means adapted to be actuated by the incoming water to control the period of softening and regeneration, a plurality of valves for placing the system in either softening or regenerating position, a hydrostatic means for controlling said valves, the application of which is controlled by said controlling means, a float control tank, a float and float arm, a valve controlled thereby for controlling the passage of regenerating fluid to the softening tank, means of conveying regenerating fluid to the softening tank, and a second valve controlled by said hydrostatic means located in said means for conveying regenerating fluid.

28. In a water softening apparatus, a softening tank, a regenerating tank, valves adapted to control the passage of water through said softening tank to service and the passage of regenerating fluid from the regenerating tank to the softening tank and a drain and meter adapted to control the successive periods of softening, regeneration and flushing according to the quantity of water passing therethrough and into the system, and means for hydrostatically controlling some of said control valves through hydrostatic pressure taken from the water passing through said system.

29. In a water softening apparatus, a softening tank, a brine tank, and inlet hard water line adapted to pass water through a meter on its way to the softening tank, a line from the brine tank to the softening tank, a valve controlling the delivery of water to service from the softening tank adapted to shut when the softening period ends and open when it begins, a hydrostatically-operated valve controlled by said meter through a master needle valve, said hydrostatically-operated valve being adapted to control the drain, a drain line and a needle valve and a brine valve controlled by said meter whereby the successive periods of regeneration, flushing and softening are controlled by the quantity of water passing through said meter.

30. In combination, a softening tank, a brine tank, a hard water line, a meter in said hard water line, a brine line from the softening tank to the brine tank, a needle control valve controlled by said meter, a brine valve controlled by said meter, an injector, a service line, a valve controlling said service line hydrostatically controlled by the water in said system from the incoming hard water line, a drain valve hydrostatically controlled whereby the alternate periods of regeneration, flushing and softening are controlled according to the quantity of water passing through said meter.

31. In a water softening apparatus, a measuring means to regulate the periods of regeneration, softening and flushing, a brine tank adapted to deliver brine to a softening tank, and a softening tank, and valves each controlling a drain, a brine line and a service line, and a needle valve controlled by said measuring means to assist in regulating the operation of the successive periods of operation of the water softening apparatus.

32. In a water softening apparatus, a measuring means to regulate the periods of regeneration, softening and flushing, a brine tank for delivering brine to a softening tank, and a softening tank, a drain for draining brine from the softening tank, a brine line for delivering brine from the brine tank to the softening tank, a service line for delivering softened water from the softening tank to the point where it is to be used, and valves controlling said drain line, brine line and service line, and a needle valve controlled by said measuring means, and an injector for causing the brine to be drawn from the brine tank to the softening tank.

In testimony whereof, I affix my signature.

CHARLES P. EISENHAUER.